C. W. M. GUHLE.
VEHICLE FENDER.
APPLICATION FILED OCT. 28, 1908.

938,053.

Patented Oct. 26, 1909.
4 SHEETS—SHEET 1.

INVENTOR
Charles W. M. Guhle

WITNESSES

BY

ATTORNEY

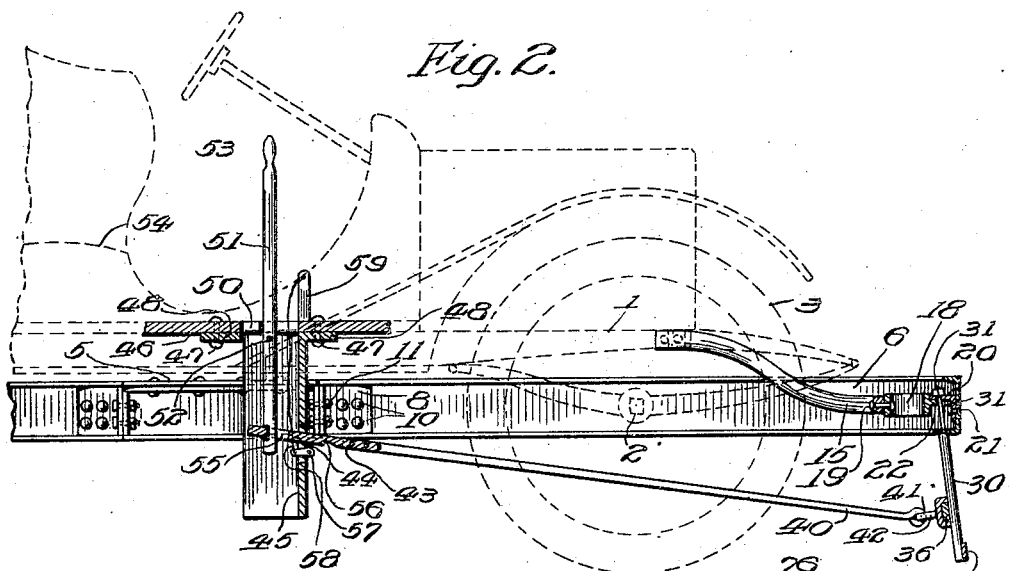

C. W. M. GUHLE.
VEHICLE FENDER.
APPLICATION FILED OCT. 28, 1908.
938,053.
Patented Oct. 26, 1909.
4 SHEETS—SHEET 3.
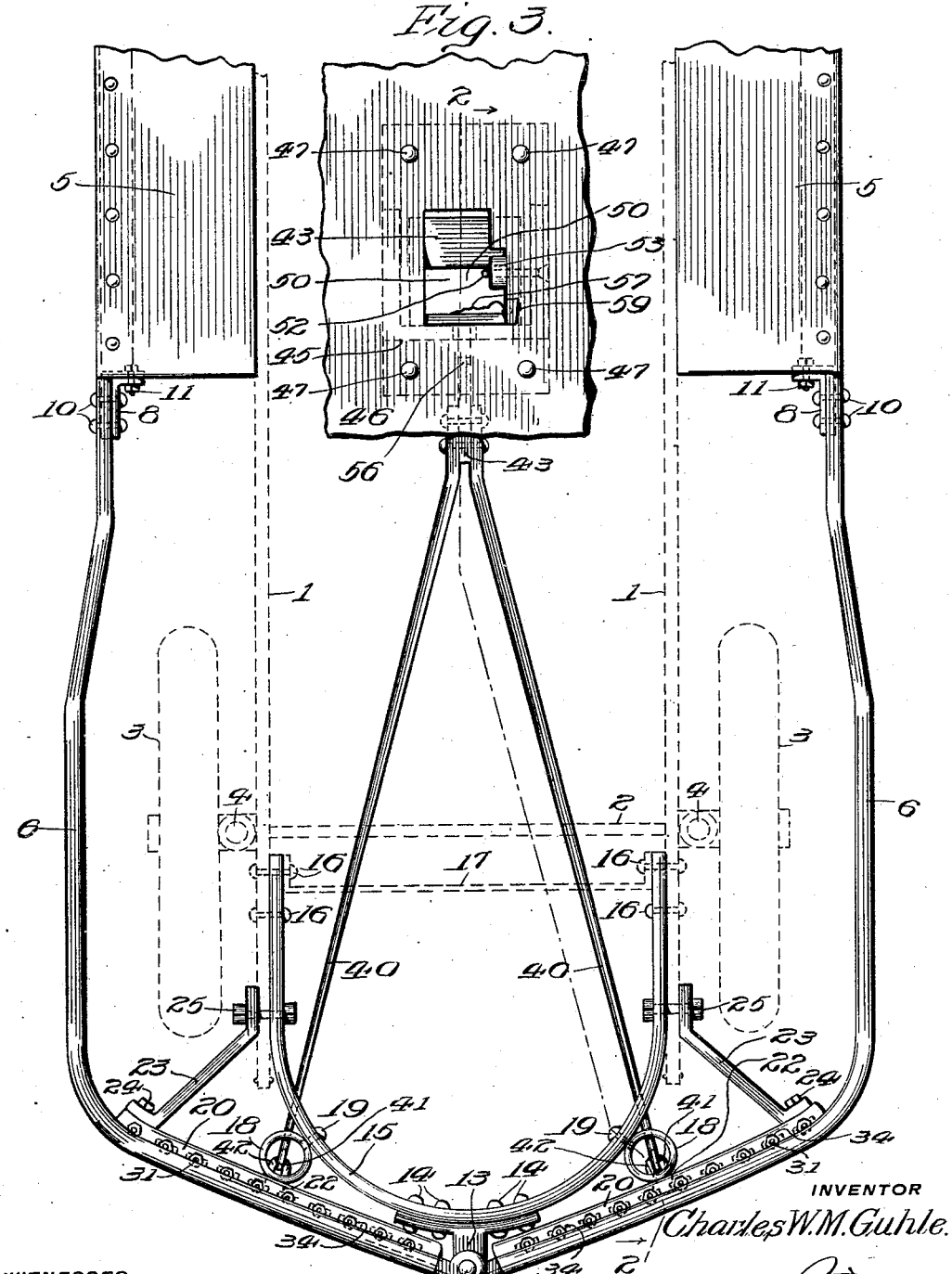
WITNESSES
INVENTOR
Charles W. M. Guhle.
BY
ATTORNEY

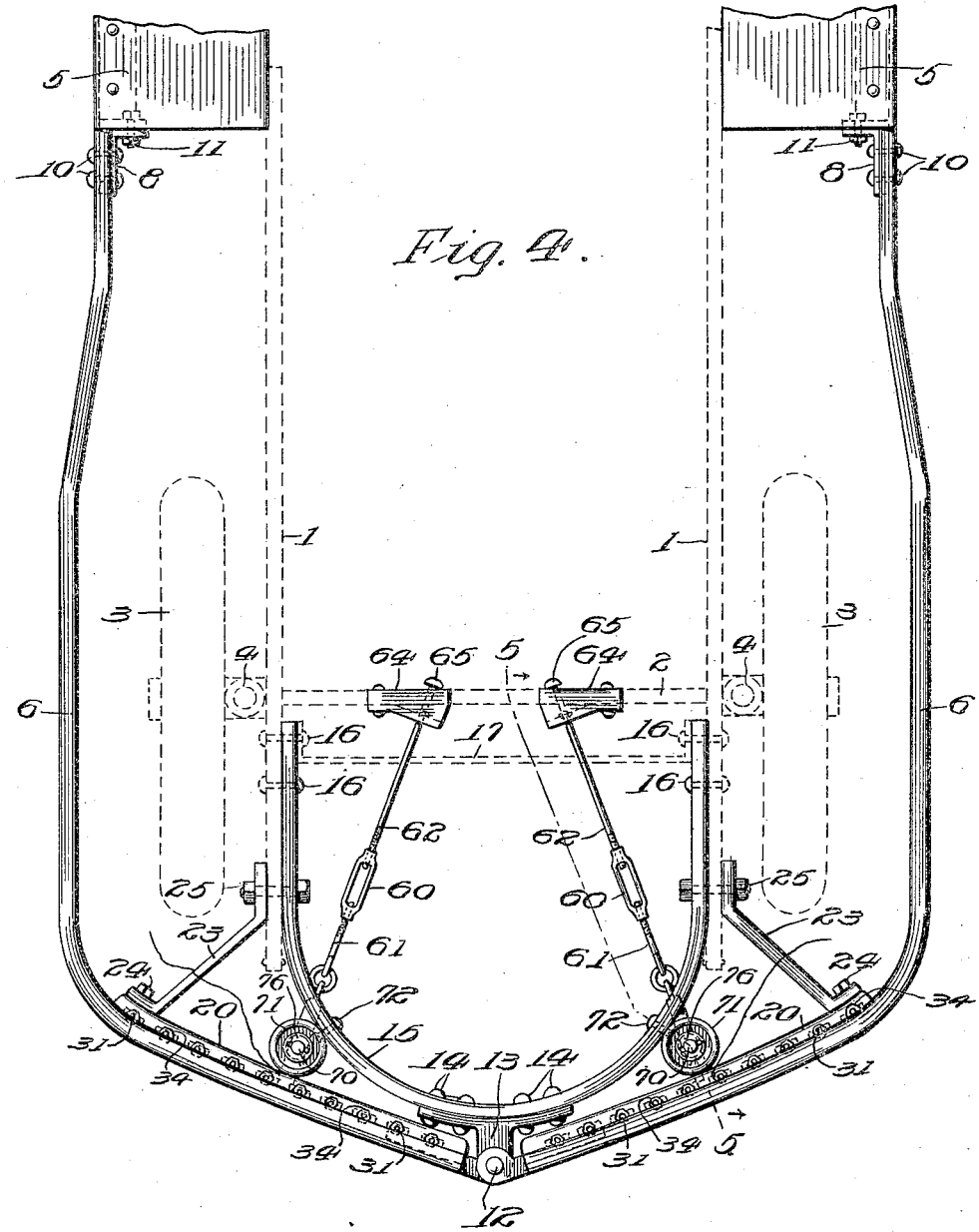

UNITED STATES PATENT OFFICE.

CHARLES W. M. GUHLE, OF TUCKERTON, NEW JERSEY, ASSIGNOR OF ONE-HALF TO FREDERICK J. RITTER, OF PHILADELPHIA, PENNSYLVANIA.

VEHICLE-FENDER.

938,053.

Specification of Letters Patent.  Patented Oct. 26, 1909.

Application filed October 28, 1908. Serial No. 459,817.

*To all whom it may concern:*

Be it known that I, CHARLES W. M. GUHLE, a citizen of the United States, and a resident of Tuckerton, Ocean county, State of New Jersey, have invented certain new and useful Improvements in Vehicle-Fenders, of which the following is a full, clear, and exact disclosure, reference being had to the accompanying drawings, forming a part of this specification.

This invention relates to fenders and particularly to fenders adapted to be used with motor vehicles.

The main objects of this invention are to provide an improved fender particularly adapted for use with motor vehicles, that may be readily adjusted to any motor vehicle of the usual type, that will minimize the shock of a collision and will protect the vehicle and passengers from injury due to collision; to provide a fender that will prevent injury to pedestrians by automatically and safely ejecting them from the path of the vehicle; and to provide other improvements as will appear hereinafter.

Figure 1:
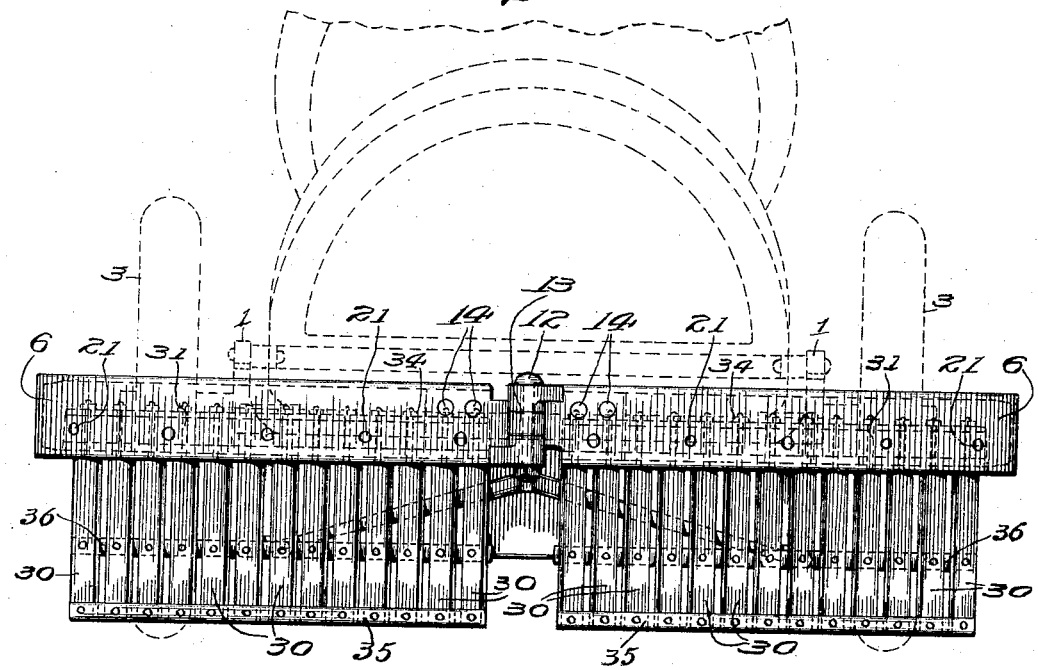
Figure 6:
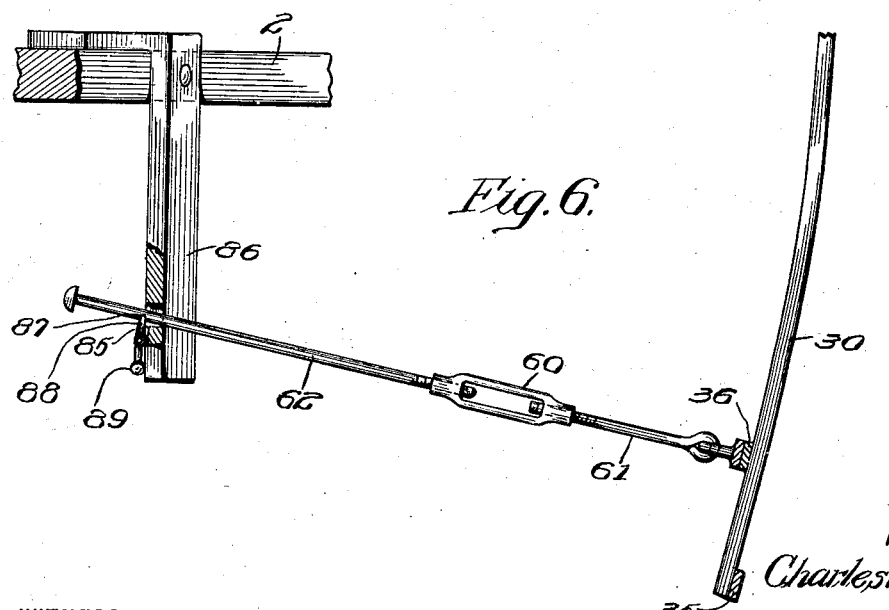

In the accompanying drawings, Figure 1 is a fragmentary front elevation of a fender constructed in accordance with this invention and showing the same applied to a motor vehicle, the vehicle being shown in dotted lines; Fig. 2 a longitudinal central vertical section of the same on line 2—2 of Fig. 3; Fig. 3 a fragmentary top plan view of a portion of the same; Fig. 4 a fragmentary top plan view of a modified form of the invention; Fig. 5 a vertical section on line 5—5 of Fig. 4 but showing the fender set; Fig. 6 a fragmentary side elevation partly in section showing a further modification of this invention; and Fig. 7 is an enlargement of a portion of Fig. 2 but showing the parts in operative position.

Referring to the drawings, the side bars 1, the axle 2, the wheels 3 pivoted at 4 to the axle, and the side steps 5, represent the front part of a standard motor vehicle. My improved fender comprises a guard 6, of channel shape iron or steel opening inwardly, upon each side of the vehicle, extending from the forward end of each step 5 around the outside of the plane of the wheels, the guards converging forwardly in front of the wheels, and meeting intermediate of the sides of the vehicle.
The rear end of each guard 6 is detachably secured to the corresponding step by means of a bracket 8 which is preferably rigidly secured by rivets 10 to the end of the guard and is detachably secured by the bolt 11 to the end of the step. The forward ends of both guards are pivoted upon a pin 12 which is carried by a bracket 13 rigidly secured by means of rivets 14 to the front side of a yoke 15, the rear ends of which are securely fastened by rivets 16 or otherwise to the inner sides of the forward ends respectively of the side bars 1 of the vehicle.

Between the ends of the yoke 15 a transverse brace 17 may be secured to further stiffen the device, and a brace 18 of circular or other suitable form is rigidly secured to each side of the front of the yoke by means of a rivet 19, between the yoke and an angle iron 20 rigidly secured in the channel of the guard by rivets 21 to brace the guards, and each circular brace rests loosely against the adjacent angle iron and is provided with a projection 22 resting against the under side of the rear edge of the adjacent angle iron to support the same.

The angle iron 20 secured in the channel of each guard 6 extends longitudinally of the guard from a point adjacent its pivot at the front end thereof to a point outside of the adjacent front wheel of the machine. An oblique brace 23 may be interposed between the outer end of the angle iron and the outer side of the adjacent end of the side bar 1 of the machine, and detachably held in place by means of a bolt 24 through the forward end of the brace and through the angle iron and guard and a bolt 25 through the rear end of the brace and the side bar 1 and yoke 15 of the machine. With this construction in mind it is evident that by detaching the rear ends of the guards, the guards may be swung forwardly in a horizontal plane to clear the wheels of the vehicle to permit access to or removal of the wheels.

For insuring the safe ejection of pedestrians or other obstacles from the path of the vehicle there is provided a series of depending spring arms 30 arranged upon each side of the front of the vehicle. The upper ends of each arm terminate in a longitudinal bolt 31 secured through an aperture 32 provided therefor in the lower web of the guard and an aperture 33 provided in the angle iron 20 by means of a nut 34, to hold the upper ends of the arms in an inclined position, the arms extending normally downwardly and forwardly.

The lower ends of each series of spring arms are connected by means of two bands 35 and 36, one band 35 being arranged upon the front and at the ends of the arms and the other band 36 being spaced above the first band 35 and arranged on the rear side of the arms.

For simultaneously retracting both series of spring arms 30 and holding the same under tension there is provided a pair of tie rods 40. Each of the tie rods 40 terminates at its forward end in an eye 41 engaging an eye 42 rigid with one of the strips 36 connecting the lower ends of one series of the spring arms upon the rear side thereof. These tie rods are thus secured respectively to each series of spring arms and converge rearwardly and are rigidly connected at their rear ends upon the opposite sides of a rearwardly extending bar 43. The rear end of this bar 43 connecting the tie rods 40, extends loosely through an aperture 44 in the lower end of a bracket 45 which depends from and is rigidly secured to the under side of the central portion of the body 46 of the vehicle by means of rivets 47 through a flange 48 upon the upper end of the bracket. The bracket 45 is preferably formed of channel iron U-shaped in cross section and opening rearwardly and is located beneath and in alinement with an aperture 50 in the bottom of the body of the vehicle.

For retracting the fender, a hand lever 51 is pivoted at 52 to the bracket 45 and extends upwardly through the aperture 50 in the vehicle and terminates at its upper end in a handle 53, located substantially in front of the seat 54 of the vehicle. The lever depends downwardly from its pivot and loosely engages at its lower end in an aperture 55, provided therefor in the rear end of the tie bar 43, whereby when the handle of the lever is bent forward the tie bar is thrown rearwardly retracting both series of spring arms 30 by means of the tie rods 40.

To hold the fender in retracted position, the underside of the tie bar 43 is provided with a notch 56 adapted to be engaged by the free end 56' of a catch 57 pivoted at one end to the bracket 45 beneath the tie bar and extending rearwardly from its pivot. The free end of this catch normally tends to swing downwardly about its pivot and out of engagement with the notch. A cord 58 is connected at one end to the free end of the catch and extends upwardly through the opening in the body of the vehicle and is connected at its upper end to the upper end of an arm 59, which projects rigidly upwardly from the bottom of the vehicle. This cord is used to lift the catch into engagement with the notch of the tie bar and is sufficiently long to permit the catch to fall out of engagement with the notch when the tie bar is moved rearwardly. The catch is disengaged by the rearward movement of the tie bar but when in engagement with the tie bar cannot be released by any forward pull upon the tie bar, as the bracket 45 holds the bar against the catch and prevents the free end of the catch from rotating forwardly sufficiently to release the same.

The modification of this invention, shown in Figs. 4 and 5, is identical with the form already described, except in respect to the means used for retracting and locking the fender. In this modification instead of the tie rods 40, heretofore described, a pair of turn buckles 60 are used, each buckle being threaded upon oppositely extending tie rods 61 and 62. The forward tie rod 61 of each turn buckle is linked at its forward end to a bracket 63 which is rigidly secured to the band 36, connecting the lower ends of the adjacent series of spring arms 30. Each of the tie rods 62 extending rearwardly from the buckle passes slidably through a bracket 64 rigid with the axle 2 of the machine and is provided at its end with a head 65 to prevent the withdrawal of the rod from the bracket.

The modified means, shown in Fig. 5, for locking the fender in its retracted position, comprises a pair of locking bolts 70 arranged upon opposite sides of the machine. Each of these bolts is slidably mounted in a vertical tubular casing 71, which is secured at its upper end between the front side of the yoke 15 and the angle iron 20, rigid with the adjacent guard, in place of the circular brace 18, heretofore described. This casing 71 is rigidly connected to the yoke by means of a rivet 72, but only loosely engages against the angle iron 20, and has a stud 73 projecting loosely beneath the angle iron to support the same.

Each locking bolt 70 passes loosely through a bushing 74, rigidly secured within the casing by means of screws 75 and has a collar 76 rigidly secured thereto, adjacent its upper end and fitting loosely within the casing. A spiral spring 77 is interposed between the bushing 74 and the collar 76 to hold the bolt normally in its retracted or inoperative position. The lower end of the bolt projects slidably through an aperture provided therefor in the lower end of the casing and terminates in a rearwardly extending catch 78, which forms an upwardly facing shoulder on the bolt adapted to engage the downwardly facing shoulder 79 located in an aperture in the bracket 63, through which the end of the bolt projects when the bolt is in its locked position as shown. To hold each bolt in its locked position a pawl 79 is pivoted in an aperture provided therefor in the side of the casing depending downwardly from its axis and adapted to engage at its lower end in a notch 80, provided therefor in the side of the bolt. The pawl 79 is normally out of engagement with the bolt but may be placed in engagement when it is desired to lock the bolt.

A further modification of the locking device is shown in Fig. 6, in which instead of the catch or bolt, heretofore described, a weighted catch 85 is pivoted to the rear side of the fixed bracket 86, supporting the rear end of each tie rod 62, and is adapted to engage a notch 87 in the under side of the rod, holding the tie rod against forward movement, but being released by the rearward movement of the rod. This catch is in the form of a pivoted lever having an upwardly extending arm 88, adapted to engage the notch in the tie rod and a downwardly extending arm 89, having an enlarged end forming a weight to hold the catch normally in engagement with the rod, the rod being nearly balanced about its axis.

In the operation of the preferred form of this invention, shown in Figs. 1, 2 and 3, the two series of spring arms forming the fender are retracted by means of the forward movement of the handle 53 of the pivoted handle bar 51, and the arms are then locked in their retracted positions by pulling on the cord 58 to bring the catch 57 in engagement with the notch 56 of the tie bar. When the fender, thus set, collides with a pedestrian or other obstacle of similar weight, the sudden force of the collision is sufficient to spring the arms rearwardly, thus minimizing the severity of the shock and danger of injury, and at the same time releasing the catch whereupon the resiliency of the spring arms is such that the lower ends of the arms are thrown forward to eject the person or obstacle from the path of the vehicle by an easy and safe action.

In the operation of the modified form of the device, shown in Figs. 4 and 5, the spring arms are retracted by means of the turnbuckles, the heads 65 upon the rear ends of the tie rods being in engagement with the rear sides of the brackets 64 during this process. The bolt 70 is then pressed down into position manually to lock the spring arms in position and the turnbuckles are then rotated to increase the effective length of the tie rods to move the heads 65 of the tie rods rearwardly from the brackets, so that when the fender is released by impact against an obstacle, as heretofore described, the spring arms will be permitted to flex forwardly to eject the obstacle from the path of the vehicle.

In the operation of the modified form of locking device, shown in Fig. 6, the turnbuckles are first loosened to permit the catches to engage in the notches of the tie rods, whereupon the turnbuckles are tightened to retract the spring arms of the fender. When the fender thus set meets an obstacle the spring arms will be flexed rearwardly and the tie rods forced rearwardly, swinging the upper ends of the catches out of engagement with the rods, and the momentum of the catches will keep the catches out of contact with the rods long enough to permit the spring arms to recover from their rearward movement and to flex forwardly and draw the notched portions of the rods forwardly beyond the reach of the catches, thus releasing the fender and permitting it to force the obstacle out of the path of the machine.

Although only a few of the modifications which may be made in this invention have been described herein, it is obvious that other changes might be made without departing from the spirit of this invention or the scope of the appended claims.

Having thus fully described my invention what I claim and desire to protect by Letters Patent of the United States is:

1. The combination with a vehicle, of a fender comprising a spring arm fixed at one end, and means connected to the free end of said arm and detachably connected to said vehicle to hold said spring arm in a flexed condition, said arm being released from said condition by a further flexing thereof.

2. The combination with a vehicle, of a fender comprising a spring arm secured at one end to a fixed support and depending downwardly in front of said vehicle, and means secured to the lower end of said arm and detachably connected to said vehicle to hold said arm in a flexed condition, said arm being released from said means by a rearward movement of the lower end of said arm.

3. The combination with a vehicle, of a fender comprising a guard extending around the front thereof, a spring arm secured to said guard and depending therefrom, and a tie rod and a pivoted catch to hold said arm in a flexed condition, said catch being released by the movement of said arm.

4. The combination with a vehicle, of a fender comprising a spring arm fixed at one end, a tie rod connected to the other end of said arm for holding said arm in a flexed condition, and a catch to hold said tie rod, said tie rod being released from said catch by the movement of the free end of said arm.

5. The combination with a vehicle, of a fender comprising a spring arm rigidly secured at one end, and a notched tie rod connected to the free end of said spring arm and detachably connected to a fixed support, for flexing said arm.

6. The combination with a vehicle, of a fender comprising a spring arm rigidly secured at one end, a bracket secured to said vehicle and provided with an aperture, a tie bar connected to the free end of said spring arm for flexing said arm, said tie bar passing slidably through said aperture, and means to prevent the withdrawal of said bar through said aperture.

7. The combination with a vehicle, of a fender comprising a spring arm secured to said vehicle and depending therefrom, a tie rod connected to said spring arm for flexing the same, and means detachably engaging said tie rod for holding said arm in flexed condition.

8. The combination with a vehicle, of a fender comprising a spring arm secured to said vehicle, and depending therefrom, a hand lever pivoted to said vehicle and connected to said arm for flexing the same, and a catch for holding said arm in flexed condition, said catch being released by flexing said arm.

9. The combination with a vehicle having a wheel of a fender comprising a guard extending upon each side thereof outside of the plane of said wheel, converging forwardly and meeting intermediate the sides of the vehicle, and a series of flexible arms secured to said guard, one end of said arms being free to yield and means for retracting the free end of said arms and holding them in a flexed condition.

10. The combination with a vehicle, of a fender connected to said vehicle and provided with a flexible resilient arm free to yield at one end, and means connected with the free end of said arm for holding said arm in a flexed condition under tension.

11. The combination with a vehicle, of a fender connected to said vehicle and provided with a flexible resilient arm free to yield at one end, and means connected with the free end of said arm and connected to said vehicle, for holding said arm in a flexed condition under tension.

12. The combination with a vehicle, of a fender therefor, comprising a substantially horizontal guard upon each side thereof, each of said guards being detachably connected at its rear end and being pivoted upon a substantially vertical pivot at its forward end to said vehicle, and a series of spring arms depending from each of said guards, the lower ends of said arms being free to yield, and means connected to the lower ends of said arms and detachably connected to said vehicle for holding said arms retracted.

13. The combination with a vehicle, of a fender comprising a substantially horizontal guard arranged upon each side of said vehicle, said guards converging toward the front of said vehicle, a series of spring arms depending from each of said guards in the front of said vehicle, a band connecting the lower ends of each of said series, and means connected to each of said bands for flexing said arms.

14. The combination with a vehicle having an axle, of a fender comprising a substantially horizontal guard arranged upon each side of said vehicle, said guards converging toward the front of said vehicle, a series of spring arms depending from each of said guards in the front of said vehicle, a band connecting the lower ends of each of said series, and means connected between each of said bands and the body of said vehicle for flexing said arms.

15. The combination with a vehicle having an axle, of a fender comprising a substantially horizontal guard arranged upon each side of said vehicle, said guards converging toward the front of said vehicle, a series of spring arms depending from each of said guards in the front of said vehicle, a band connecting the lower ends of each of said series, a tie rod linked to each of said bands, said rods converging rearwardly, a tie bar connecting the rear ends of said tie rods and slidably connected to the body of the vehicle, and a hand lever pivoted to the body of the vehicle and connected to said tie bar to flex said spring arms.

16. The combination with a vehicle having side steps and an axle, of a fender comprising a guard upon each side of said vehicle, each of said guards being detachably connected at its rear end to one of said steps and being pivoted at its front end to the said vehicle in front of and intermediate the sides thereof, a series of spring arms depending from each of said guards in front of said vehicle, a band connecting the free ends of each series of arms, a tie rod connected to each band and slidably connected to the body of the vehicle and a catch for holding said arms in flexed condition.

17. The combination with a vehicle, of a fender comprising an arm secured to said vehicle at one end and free to yield at its other end, and a tie rod connected to the free end of said arm and detachably connected to said vehicle for holding said arm retracted.

18. The combination with a vehicle, of a fender comprising a flexible arm fixed at one end and free to yield at its other end, and means connected to the free end of said arm and detachably connected to said vehicle for holding said arm retracted.

19. The combination with a vehicle, of a fender comprising a flexible resilient arm connected at one end to said vehicle and free to yield at its other end, and means connected to the free end of said arm and detachably connected to said vehicle for holding said arm in flexed condition.

20. The combination with a vehicle, of a fender comprising a resilient flexible arm secured to said vehicle at one end and free to yield at its other end, and a tie rod connected to the free end of said arm and detachably connected to said vehicle for holding said arm in a retracted position.

21. The combination with a vehicle, of a fender comprising a resilient flexible arm secured to said vehicle at one end and free to yield at its other end, and a tie rod connected to the free end of said arm and detachably connected to said vehicle for holding said arm in a retracted position, said arm being released from said retracted position by further flexing thereof.

In witness whereof I have hereunto set my hand this 27th day of October A. D. 1908.

CHARLES W. M. GUHLE.

Witnesses:
FREDERICK A. BLOUNT,
ALEXANDER PARK.